(12) United States Patent
Admon et al.

(10) Patent No.: US 11,907,559 B1
(45) Date of Patent: Feb. 20, 2024

(54) PHYSICALLY SECURE MEMORY PARTITIONING

(71) Applicant: WINBOND ELECTRONICS CORPORATION, Taichung (TW)

(72) Inventors: Itay Admon, Pardes Hanna (IL); Uri Kaluzhny, Beit Shemesh (IL); Nir Tasher, Herzliya (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 17 days.

(21) Appl. No.: 17/883,651

(22) Filed: Aug. 9, 2022

(51) Int. Cl.
*G06F 12/14* (2006.01)
*G06F 3/06* (2006.01)
*G06F 11/10* (2006.01)

(52) U.S. Cl.
CPC .......... *G06F 3/0644* (2013.01); *G06F 3/0622* (2013.01); *G06F 11/1044* (2013.01); *G06F 3/0679* (2013.01)

(58) Field of Classification Search
CPC .... G06F 21/602; G06F 21/79; G06F 21/6209; G06F 8/61; G06F 21/78; G06F 12/1408; G06F 12/145; G06F 21/53; G06F 21/6218; G06F 21/82; G06F 2212/1052; G06F 2212/401; G06F 2212/402; G06F 3/0623; G06F 11/073; G06F 11/0751; G06F 11/0796; G06F 11/20; G06F 12/0607; G06F 12/0846; G06F 12/0855; G06F 12/0859; G06F 12/1036; G06F 12/109; G06F 12/1458; G06F 12/1475; G06F 17/10; G06F 21/565; G06F 21/86; G06F 2221/034; G06F 2221/2129; G06F 9/4484

See application file for complete search history.

(56) References Cited

U.S. PATENT DOCUMENTS

2020/0082100 A1* 3/2020 Almeida ............... G06F 21/602

* cited by examiner

*Primary Examiner* — Yong J Choe
(74) *Attorney, Agent, or Firm* — Kligler & Associates Patent Attorneys Ltd.

(57) ABSTRACT

A memory device includes a memory, a secure-access circuit, a plain-access circuit, and protection hardware. The memory includes at least a secure-storage partition assigned a first address range and a plain-storage partition assigned a second address range, disjoint from the first address range. The secure-access circuit is configured to access the secure-storage partition by generating addresses in the first address range. The plain-access circuit is configured to access the plain-storage partition by generating addresses in the second address range. The protection hardware is configured to prevent the plain-access circuit from accessing the first address range assigned to the secure-storage partition.

14 Claims, 2 Drawing Sheets

| | | |
|---|---|---|
| 44 | DATA | CRC OVER DATA & ADDRESS |
| | DATA | CRC OVER DATA & ADDRESS | 48
| | DATA | CRC OVER DATA & ADDRESS | 48
| 44 | DATA | CRC OVER DATA & ADDRESS |
| | ⋮ | ⋮ |
| | DATA | CRC OVER DATA & ADDRESS |
| | DATA | CRC OVER DATA & ADDRESS |

US 11,907,559 B1

PHYSICALLY SECURE MEMORY PARTITIONING

FIELD OF THE INVENTION

The present invention relates generally to secure data storage, and particularly to physically secure memory partitioning.

BACKGROUND OF THE INVENTION

In various applications and host systems, a memory device is used for storing both secure data and plain data. For example, a section of a memory device may be reserved for storage of sensitive data such as cryptographic keys. It is important to ensure that secure data is accessed only by authorized parties, even when the device is subjected to fault injection attacks.

SUMMARY OF THE INVENTION

An embodiment of the present invention that is described herein provides a memory device including a memory, a secure-access circuit, a plain-access circuit, and protection hardware. The memory includes at least a secure-storage partition assigned a first address range and a plain-storage partition assigned a second address range, disjoint from the first address range. The secure-access circuit is configured to access the secure-storage partition by generating addresses in the first address range. The plain-access circuit is configured to access the plain-storage partition by generating addresses in the second address range. The protection hardware is configured to prevent the plain-access circuit from accessing the first address range assigned to the secure-storage partition.

In some embodiments, the protection hardware is configured to prevent the plain-access circuit from generating addresses in the first address range assigned to the secure-storage partition.

In an embodiment, the addresses in the first address range have one or more given bits set to respective first bit values, the addresses in the second address range have the one or more given bits set to respective second bit values, opposite to the respective first bit values, and the protection hardware includes hardwiring of respective lines on an address bus of the plain-access circuit to the respective second bit values, thereby preventing the plain-access circuit from generating addresses in the first address range assigned to the secure-storage partition.

In an example embodiment, a Hamming distance between any address in the first address range and any address in the second address range is greater than one. In a disclosed embodiment, the protection hardware is configured to assert a dedicated control signal when accessing the secure-storage partition, and the memory is configured to permit access to the secure-storage partition only while the dedicated control signal is asserted.

In some embodiments, one or both of the secure-access circuit and the plain-access circuit are configured to (i) store data in a given address by calculating an Error Detection Code (EDC) or Error Correction Code (ECC) over both (i) at least part of the data and (ii) at least part of the given address, and store both the data and the EDC or ECC, (ii) verify the EDC or ECC upon reading the data from the given address, and (iii) in response to an error detected by the EDC or ECC, identify a fault or attack and refrain from providing the data as output. In an embodiment, the EDC is a Cyclic Redundancy Check (CRC) code.

There is additionally provided, in accordance with an embodiment that is described herein, a method for memory access. The method includes, in a memory, which includes at least (i) a secure-storage partition assigned a first address range and (ii) a plain-storage partition assigned a second address range disjoint from the first address range, accessing the secure-storage partition using a secure-access circuit by generating addresses in the first address range, and accessing the plain-storage partition using a plain-access circuit by generating addresses in the second address range. The plain-access circuit is prevented from accessing the first address range assigned to the secure-storage partition.

The present invention will be more fully understood from the following detailed description of the embodiments thereof, taken together with the drawings in which:

DETAILED DESCRIPTION OF EMBODIMENTS

Overview

Figures 1, 2:
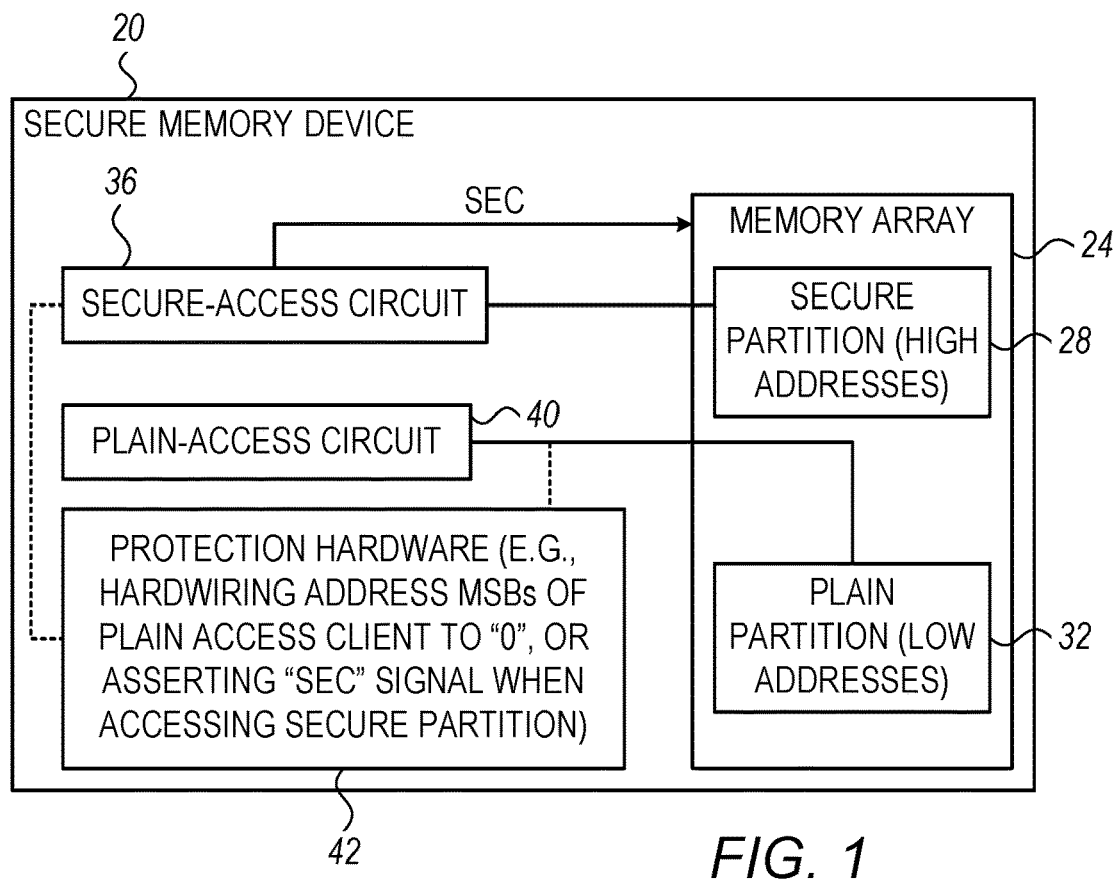
FIG. 1 is a block diagram that schematically illustrates a secure memory device, in accordance with an embodiment of the present invention.
FIG. 2 is a diagram that schematically illustrates secure data storage using Cyclic Redundancy Check (CRC), in accordance with an embodiment of the present invention.

Embodiments of the present invention that are described herein provide improved techniques for storing both secure data and plain data in the same memory device.

In the disclosed embodiments, a secure memory device comprises a memory in which one or more memory regions are designated as secure-storage partitions, and one or more regions are designated as plain-storage partitions. Each partition is assigned a respective address range. The secure memory device further comprises at least one secure-access circuit that is configured to access the secure-storage partition, i.e., to generate the addresses in the corresponding range, and at least one plain-access circuit that is configured to access the plain-storage partition.

The use of disjoint address ranges and separate memory-access circuits provides some degree of logical separation between secure data and plain data. Nevertheless, such a configuration is still vulnerable to physical attacks, e.g., fault injection or power glitching, which may cause a plain-access circuit to access a secure-storage partition inadvertently, i.e., to generate an address falling in the address range of the secure-storage partition.

In some embodiments of the present invention, the secure memory device comprises hardware-implemented measures that prevent plain-access circuits from accessing the secure-storage partitions. For example, such protection hardware (denoted 42 in FIG. 1) may prevent the plain-access circuits from generating addresses that fall in the address ranges of the secure-storage partitions. For ease of explanation, the description that follows will refer mainly to a device comprising a single secure-storage partition, a single plain-storage partition, a single secure-access circuit and a single plain-access circuit. The disclosed techniques, however, are not limited to this configuration and can be used with any suitable number of secure-storage partitions, plain-storage partitions, secure-access circuits and plain-access circuits.

In some embodiments, the memory is divided into a "low" address range and a "high" address range. The low address range comprises the addresses in which a predefined number of Most Significant Bits (MSBs) are "0". The high address range comprises the addresses in which one or more of these MSBs have a different value than the low address range. Any suitable number of MSBs, e.g., a single MSB, can be used for this separation. The low address range is designated as a plain-storage partition, and the high address range is designated as a secure-storage partition.

To prevent a plain-access circuit from generating addresses in the high address range, the predefined number of MSBs on the address bus of the plain-access circuit are hardwired to a voltage corresponding to logical "0". With this protection measure, a physical attack or a hardware fault cannot cause the plain-access circuit to generate an address belonging to the secure-storage partition.

In some embodiments, the address ranges of the secure-storage and plain-storage partitions are assigned so that the Hamming distance between any address in the secure-storage partition and any address in the plain-storage partition is greater than one. This condition is stricter than merely assigning disjoint address ranges, and mandates a suitable offset between them. In one example, the low address range comprises the addresses having four MSBs equal to "0", whereas the high address range comprises the addresses having the four MSBs equal to 0x3 (or 0x6, or any other four-bit value comprising at least two "1"s).

In some embodiments, an additional protection measure comprises a dedicated control signal that the secure-access circuit asserts when accessing the secure-storage partition. The memory array comprises circuitry that monitors the dedicated control signal, and permits access to the secure-storage partition only if the signal is asserted. The plain-access circuit does not support this signal, and is therefore prevented from accessing the secure-storage partition.

In some embodiments, when writing data to a memory line, the secure-access circuit and/or the plain-access circuit writes the data along with an Error Detection Code (EDC), e.g., a Cyclic Redundancy Check (CRC) code or an Error Correction Code (ECC). When reading the data from the memory line, the memory access circuit calculates an expected EDC based on the read data, and compares it to the EDC stored in the memory line. To further block unauthorized access to the secure-storage partition, the memory access circuit calculates the EDC not only over the data, but also over at least part of the address and returns the data to the user only if the EDC matches. In this manner, even if a physical attack or hardware fault succeeded in writing to a memory line in the secure-storage partition, the illegitimate write will most likely be detected when the data is read, since the expected EDC will not match the stored EDC.

In some embodiments, the secure memory device comprises two or more of the disclosed "blocking points", thereby blocking physical attacks and mitigating hardware faults with a very high probability.

The techniques described herein are highly effective in preventing unauthorized access, to secure-storage partitions. Since the disclosed techniques are effective against both physical attacks and hardware faults, they enhance both security and safety in some use-cases, such as in automotive systems. The enhanced safety and security facilitate the sharing of memory-device resources, e.g., power supplies, charge pumps, sense amplifiers and control logic, among plain and secure partitions.

System Description

FIG. 1 is a block diagram that schematically illustrates a secure memory device 20, in accordance with an embodiment of the present invention. Device 20 comprises a memory array 24, also referred to simply as "memory" for brevity. Memory 24 may comprise, for example, a non-volatile memory such as a Flash memory, a volatile memory such as a Random Access Memory (RAM), or any other suitable memory type.

In the present example, two memory partitions are defined in memory 24—A secure-storage partition 28 and a plain-storage partition 32 (also referred to simply as "secure partition" and "plain partition", respectively). Secure partition 28 is used for storing sensitive information, for example security keys, passwords or other credentials, personal information such as credit-card numbers, or any other suitable information that is considered secure or sensitive for any reason. Access to secure partition 28 may be restricted, or require some cryptographic operation such as encryption or authentication. Plain partition 32 may be used for storing any suitable information, typically information that is considered less secure or sensitive than the information stored in secure partition 28.

Secure partition 28 and plain partition 32 are assigned respective address ranges within the address space of memory 24. The address ranges may be of the same size or of different sizes, each may be contiguous or non-contiguous, and each may comprise any suitable number of addresses. The address ranges assigned to partitions 28 and 32 are non-overlapping, i.e., disjoint.

Device 20 further comprises a secure-access circuit 36 for accessing (reading and writing) data in secure partition 28, and a plain-access circuit 40 for accessing (reading and writing) data in plain partition 32.

Each memory access circuit (secure-access circuit 36 or plain-access circuit 40) accesses (reads and/or writes) memory 24 using a data bus and an address bus. In a typical write operation, the memory access circuit (secure or plain) receives data for writing to memory 24. The memory access circuit generates an address within the address range of the appropriate partition (secure partition 28 or plain partition 32), and sends a write command with the address on the address bus and the data on the data bus to memory 24. In a typical read operation, the memory access circuit receives a request to read data from memory 24. The memory access circuit generates an address within the address range of the appropriate partition and sends a read command with the address on the address bus to memory 24. In response, memory 24 returns the requested data on the data bus.

Circuits 36 and 40 may comprise, for example, data-paths or any other suitable circuitry that performs memory-access operations. Circuits 36 and 40 may serve any suitable host, application or other entity that stores data in memory device 20.

The various components of secure memory device 20, including memory 24 and circuits 36 and 40, are typically integrated in a single semiconductor device package, e.g., on a single die or on different dies. Secure memory device 20 may be installed in any suitable host system, e.g., a computer, an automotive electronic unit, or any other.

The configurations of secure memory device 20, as shown in FIG. 1, is an example configuration that is chosen purely for the sake of conceptual clarity. Any other suitable configuration can be used in alternative embodiments. For example, as noted above, memory 24 may comprise any suitable number of secure-storage partitions 28 and plain-storage partitions 32, and device 20 may comprise any suitable number of secure-access circuits 36 and plain-access circuits 40.

In various embodiments, secure memory device 20 can be implemented using hardware, e.g., using one or more Application-Specific Integrated Circuits (ASIC) and/or Field-Programmable Gate Arrays (FPGA). Memory 24 may comprise any suitable type of volatile or non-volatile memory, for example RAM or Flash.

Preventing Plain-Access Circuits from Accessing Secure-Storage Partitions

In various embodiments, secure memory device 20 may comprise various hardware-implemented mechanisms for preventing plain-access circuit 40 from generating addresses that fall in the address range of secure-storage partition 28. These hardware mechanisms are also referred to as "blocking points".

Hardwiring of Bus Lines in Address Bus of Plain-Access Circuit

In the embodiment seen in FIG. 1, plain partition 32 is assigned a "low" address range, and secure partition 28 is assigned a "high" address range. The low address range comprises addresses in which a predefined number of MSBs (one or more MSBs) are "0". The high address range comprises addresses in which the predefined number of MSBs are "1".

In addition, a predefined subset of lines of the address bus of circuit 40, which correspond to the MSBs that are set to "0" in the address range of plain partition 32, are hardwired to a voltage corresponding to logical "0". Depending on the logic being used, this voltage may be, for example, the supply voltage Vcc, ground, or any other suitable voltage that forces the MSBs to "0" regardless of the voltage that circuit 40 may attempt to send on these bus lines. Hardwiring the address-bus MSBs to "0" prevents plain-access circuit 40 from generating addresses in the high address range (the address range of secure partition 28).

In one example implementation, the address range of plain partition 32 is 00000000h-00FFFFFFh, providing 16 MB of plain-access memory, and the address range of secure partition 28 is 01000000h and beyond. In this example the predefined number of MSBs that are hardwired to "0" is 2. Alternatively, any other suitable address ranges and any other suitable number of MSBs can be used.

More generally, in alternative embodiments it is possible to assign a low address range to the secure partition and a high address range to the plain partition. Further alternatively, the bits that distinguish between the address ranges of the secure and plain partitions need not necessarily be the MSBs of the address. Thus, more generally put, the addresses in the address range of the secure partition have one or more given bits set to respective first bit values; the addresses in the address range of the plain partition have the one or more given bits set to respective second bit values, opposite to the respective first bit values; and device 20 comprises protection hardware 42 that forces the one or more given bits, on the address bus of the plain-access circuit, to the respective second bit values.

Maintaining Large Hamming Distance Between Address Ranges of Plain and Secure Partitions In some embodiments, the address ranges of secure partition 28 and plain partition 32 are assigned so that the Hamming distance between any address in the secure partition 28 and any address in the plain partition 32 is greater than one. The Hamming distance between two addresses is defined as the number of corresponding bits by which the addresses differ. With a Hamming distance greater than one, an attack or hardware fault will need to flip more than one bit in order to change an address in the plain partition 32 into an address in the secure partition 28. This condition significantly reduces the probability of such an event.

In one example embodiment, when using 32-bit addresses, the plain partition 32 is assigned an address range in which the four MSBs (bits [31:28]) of the address are "0". To achieve a large Hamming distance, the secure partition 28 is assigned an address range in which the four MSBs are 0x3 ("0011"). In another embodiment, the secure partition 28 is assigned an address range in which the four MSBs are 0x6 ("0110"). Further alternatively, any other four-bit value comprising at least two "1"s can be used.

Dedicated Control Signal Indicating Secure Storage

In some embodiments, protection hardware 42 is configured to assert a dedicated control signal denoted "SEC" in FIG. 1) when accessing the secure-storage partition 28, and the memory 24 is configured to permit access to the secure-storage partition 28 only while the dedicated control signal "SEC" is asserted. In some embodiments, secure-access circuit 36 asserts a dedicated control signal (denoted "SEC" in FIG. 1) while accessing secure partition 28. Memory 24 comprises circuitry that monitors the "SEC" control signal, and permits access to secure partition 28 only if the signal is asserted. Plain-access circuit 40 does not support the "SEC" control signal and cannot assert it. Therefore, even if a physical attack or hardware fault succeeds in causing plain-access circuit 40 to generate an address in the address range of secure partition 28, the circuitry in memory 24 will deny access to the secure partition because the "SEC" signal is not asserted.

Including Address in EDC (e.g., CRC) Calculation

In some embodiments, when writing data to a memory line in memory 24, the memory access circuit (secure-access circuit 36 or plain-access circuit 40) writes the data along with an Error Detection Code (EDC), e.g., a Cyclic Redundancy Check (CRC) code or an Error Correction Code (ECC). When reading the data from the memory line, the memory access circuit calculates an expected EDC based on the read data, and compares it to the EDC stored in the memory line. The read operation is considered legitimate only if the expected EDC matches the stored EDC. In some embodiments, to further block unauthorized access to secure partition 28, the memory access circuit (36 or 40) calculates the EDC not only over the data (or at least part of the data), but also over at least part of the address.

FIG. 2 is a diagram that schematically illustrates secure data storage using CRC, in accordance with an embodiment of the present invention. The figure shows a plurality of memory lines, for example in secure partition 28. Each memory line comprises a respective data field 44 and a respective CRC field 48. CRC 48 of a given memory line is calculated (e.g., by circuit 36) over both data 44 of the memory line and the address of the memory line.

When using this mechanism, even if a physical attack or hardware fault succeeded in causing plain-access circuit 40 to write to a memory line in secure partition 28, the illegitimate write will be detected (with high probability) when the data is read, since the expected EDC will not match the stored EDC.

Figure 3:
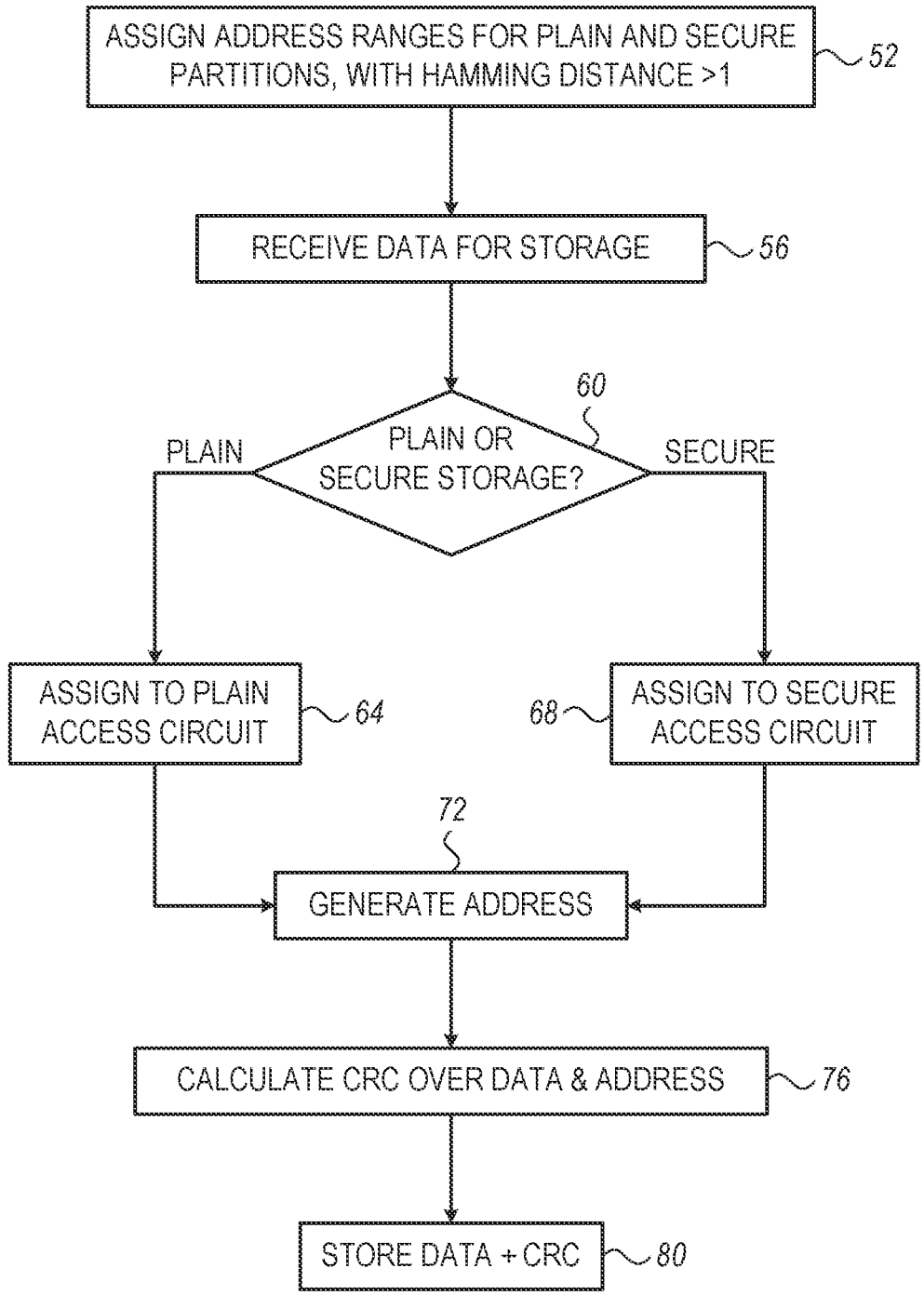
FIG. 3 is a flow chart that schematically illustrates a method for secure data storage, in accordance with an embodiment of the present invention.

FIG. 3 is a flow chart that schematically illustrates a method for secure data storage in secure memory device 20, in accordance with an embodiment of the present invention. The example of FIG. 3 refers to a write operation, by way of example. Read operations are performed in a similar manner.

The method begins at an address assignment stage 52, in which suitable address ranges are assigned to plain partition 32 and secure partition 28. At a data input stage 56, secure memory device 20 receives data for storage in memory 24. At a checking stage 60, secure memory device 20 checks whether the data is intended for plain or secure storage.

If the data is to be stored in plain partition 32, secure memory device 20 assigns the storage operation to plain-access circuit 40, at a plain assignment stage 64. If the data is to be stored in secure partition 28, secure memory device 20 assigns the storage operation to secure-access circuit 36, at a secure assignment stage 68.

At an address generation stage 72, the assigned memory access circuit generates an address at which the data is to be stored. At a CRC calculation stage 76, the memory access circuit calculates a CRC over both the data and the address. At a storage stage 80, the memory access circuit stores the data and the CRC in a memory line having the generated address.

The method flow of FIG. 3 is an example flow that was chosen purely for the sake of conceptual clarity. In alternative embodiments, any other suitable flow can be used.

FIG. 3 demonstrates that, in some embodiments, secure memory device 20 comprises two or more of the disclosed "blocking points" (hardwiring of address-bus lines of the plain-access circuit, maintaining a large Hamming distance between the address ranges of the plain and secure partitions, using a dedicated control signal indicating access to the secure partition, and including the address in EDC calculation). The use of multiple "blocking points" further reduces the probability that a physical attack or hardware fault will cause a plain-access circuit to generate an address in the address range of a secure partition. In various embodiments, various subsets of these "blocking points", and/or other suitable "blocking points", can be used.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A memory device, comprising:
a memory, comprising at least (i) a secure-storage partition assigned a first address range and (ii) a plain-storage partition assigned a second address range, disjoint from the first address range;
a secure-access circuit, configured to access the secure-storage partition by generating addresses in the first address range;
a plain-access circuit, configured to access the plain-storage partition by generating addresses in the second address range; and
protection hardware, configured to prevent the plain-access circuit from accessing the first address range assigned to the secure-storage partition.

2. The memory device according to claim 1, wherein the protection hardware is configured to prevent the plain-access circuit from generating addresses in the first address range assigned to the secure-storage partition.

3. The memory device according to claim 1, wherein:
the first address range comprises first addresses having one or more given bits set to respective first bit values;
the second address range comprises second addresses having the one or more given bits set to respective second bit values, opposite to the respective first bit values; and
the protection hardware comprises hardwiring of respective lines on an address bus of the plain-access circuit to the respective second bit values, thereby preventing the plain-access circuit from generating any of the first addresses in the first address range assigned to the secure-storage partition.

4. The memory device according to claim 1, wherein a Hamming distance between any address in the first address range and any address in the second address range is greater than one.

5. The memory device according to claim 1, wherein the protection hardware is configured to assert a dedicated control signal when accessing the secure-storage partition, and wherein the memory is configured to permit access to the secure-storage partition only while the dedicated control signal is asserted.

6. The memory device according to claim 1, wherein one or both of the secure-access circuit and the plain-access circuit are configured to:
store data in a given address by calculating an Error Detection Code (EDC) or Error Correction Code (ECC) over both (i) at least part of the data and (ii) at least part of the given address, and store both the data and the EDC or ECC;
verify the EDC or ECC upon reading the data from the given address; and
in response to an error detected by the EDC or ECC, identify a fault or attack and refrain from providing the data as output.

7. The memory device according to claim 6, wherein the EDC is a Cyclic Redundancy Check (CRC) code.

8. A method for memory access, comprising:
in a memory, which comprises at least (i) a secure-storage partition assigned a first address range and (ii) a plain-storage partition assigned a second address range disjoint from the first address range, accessing the secure-storage partition using a secure-access circuit by generating addresses in the first address range, and accessing the plain-storage partition using a plain-access circuit by generating addresses in the second address range; and preventing the plain-access circuit from accessing the first address range assigned to the secure-storage partition.

9. The method according to claim 8, wherein preventing the plain-access circuit from accessing the first address range comprises preventing the plain-access circuit from generating addresses in the first address range assigned to the secure-storage partition.

10. The method according to claim 8, wherein:
the first address range comprises first addresses having one or more given bits set to respective first bit values;
the second address range comprises second addresses having the one or more given bits set to respective second bit values, opposite to the respective first bit values; and
respective lines on an address bus of the plain-access circuit are hardwired to the respective second bit values, thereby preventing the plain-access circuit from generating any of the first addresses in the first address range assigned to the secure-storage partition.

11. The method according to claim 8, wherein a Hamming distance between any address in the first address range and any address in the second address range is greater than one.

12. The method according to claim 8, wherein preventing the plain-access circuit from accessing the first address range comprises asserting a dedicated control signal when accessing the secure-storage partition, and permitting access to the secure-storage partition only while the dedicated control signal is asserted.

13. The method according to claim 8, wherein accessing one or both of the secure-storage partition and the plain-storage partition comprises:
storing data in a given address by calculating an Error Detection Code (EDC) or Error Correction Code (ECC) over both (i) at least part of the data and (ii) at least part of the given address, and storing both the data and the EDC or ECC;
verifying the EDC or ECC upon reading the data from the given address; and
in response to an error detected by the EDC or ECC, identifying a fault or attack and refraining from providing the data as output.

14. The method according to claim 13, wherein the EDC is a Cyclic Redundancy Check (CRC) code.

* * * * *